United States Patent [19]

Meyer et al.

[11] Patent Number: 4,767,989
[45] Date of Patent: Aug. 30, 1988

[54] MOUNTING ARRANGEMENT FOR MAGNETIC FIELD DETECTOR

[75] Inventors: Hans P. Meyer; Helmut Becker, both of Nuremberg, Fed. Rep. of Germany

[73] Assignee: Alcatel N.V., Amsterdam, Netherlands

[21] Appl. No.: 813,112

[22] Filed: Dec. 24, 1985

[30] Foreign Application Priority Data

Dec. 24, 1984 [DE] Fed. Rep. of Germany ....... 3447327

[51] Int. Cl.$^4$ ............ G01R 33/06; H01L 43/08; H05K 5/00
[52] U.S. Cl. .................. 324/252; 174/52 PE; 324/235; 338/32 R
[58] Field of Search ............ 324/173, 174, 207, 208, 324/235, 251, 252, 262, 156, 163, 165, 166; 174/52 PE; 360/112, 113; 338/32 R, 32 H; 307/309; 73/DIG. 3

[56] References Cited

U.S. PATENT DOCUMENTS

| | | | |
|---|---|---|---|
| 3,195,043 | 7/1965 | Gurig et al. | 324/235 |
| 4,052,748 | 10/1977 | Kuijk | 324/252 X |
| 4,105,972 | 8/1978 | Smith | 324/220 |
| 4,283,679 | 8/1981 | Ito et al. | 324/208 X |
| 4,392,166 | 7/1983 | Ishikawa et al. | 360/113 |
| 4,629,982 | 12/1986 | Kieslich | 338/32 R X |

FOREIGN PATENT DOCUMENTS

| | | | |
|---|---|---|---|
| 0110122 | 6/1984 | European Pat. Off. | 324/207 |
| 2426420 | 12/1975 | Fed. Rep. of Germany | |
| 0148577 | 11/1979 | Japan | 324/252 |
| 0024615 | 2/1980 | Japan | 324/207 |
| 0079281 | 5/1985 | Japan | 324/251 |
| 2027206 | 2/1980 | United Kingdom | 324/208 |
| 2095034 | 9/1982 | United Kingdom | 324/252 |

OTHER PUBLICATIONS

Valvo Technische Information "Magnetoresistive Sensoren", Nr. 840323, pp. 1-8.

Primary Examiner—Gerard R. Strecker
Attorney, Agent, or Firm—Spencer & Frank

[57] ABSTRACT

A magnetic field detector has a sensor arrangement which is disposed in a housing and includes a plurality of stripe-magnetic-field-dependent resistors arranged on the underside of a dielectric support. A permanent magnet is oriented perpendicularly to the upper side of the support and to the magnetic-field-dependent resistors. In one embodiment, the sensor arrangement is located approximately in the center of the housing and a plurality of electrical contact means are attached on both sides of the permanent magnet and adjacent thereto within the housing. In another embodiment, the sensor arrangement is located laterally from the center of the housing and the electrical contact means are attached within the housing and adjacent to only one side of the magnet. The electrical contact means have internal terminals which are connected by small wire conductors to the magnetic-field-dependent resistors, and external terminals are formed into solder contacts or plug contacts which are adapted to engage a mating connector.

11 Claims, 1 Drawing Sheet

MOUNTING ARRANGEMENT FOR MAGNETIC FIELD DETECTOR

BACKGROUND OF THE INVENTION

The present invention relates to a magnetic field detector. A prior art magnetic field detector is disclosed in DE-OS No. 24 26 420, in which the magnet is surrounded by a U-shaped yoke, with one pole of the magnet being in a supporting relationship with the center leg of the yoke. On the other pole, two magnetic-field-dependent semiconductor resistors are arranged, one adjacent to the other, and a magnetic foil of soft magnetic material that controls the magnetic field is slidably disposed thereon. The cited prior art has a particular problem regarding the interconnection of the magnetic-field-dependent semiconductor resistors, with the connectors of a printed circuit or other mating connection of the circuit.

It is the object of the present invention to solve the problem of designing a magnetic field sensor of the above-recited nature so as to permit it to be easily inserted into a printed circuit, or to which connection can be easily made with a corresponding connector.

SUMMARY OF THE INVENTION

In accordance with the present invention, a magnetic field detector has a sensor arrangement including a dielectric support with stripes of field-dependent-resistors on the underside thereof and has a pole plate positioned on the upper surface. A permanent magnet is oriented perpendicularly to the resistors with one pole in contact with the pole plate. The detector comprises a housing having a base wall, a detector wall and at least one side wall. The sensor arrangement is disposed within the housing with the support (resistors) oriented adjacent to the detector wall of the housing. A plurality of electrical contact means having internal contacts which are positioned adjacent to and spaced apart from the magnet, and having external contacts which are extended through either the base wall or the side wall of the housing, are provided. A plurality of small wire conductors interconnect the internal contacts to the field-dependent-resistors.

BRIEF DESCRIPTION OF THE DRAWING

While the novel features of the invention are set forth with particularity in the appended claims, the invention will be better understood from the following detailed description taken in conjunction with the drawing, in which:

DETAILED DESCRIPTION OF THE INVENTION

Figure 1:
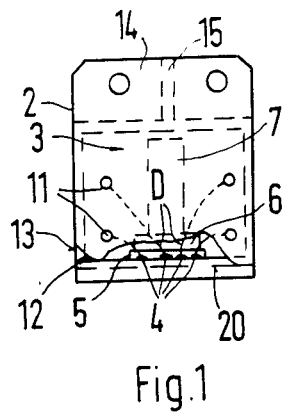
FIG. 1 is a front elevation view of one embodiment of the invention.
Figure 2:
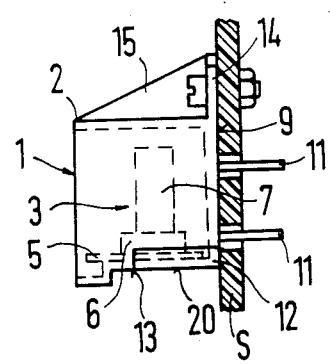
FIG. 2 is a side elevation view of the invention of FIG. 1, shown attached to a printed circuit.

Referring to FIGS. 1 and 2, there is shown a magnetic field sensor arrangement 3 which is positioned approximately in the center of a housing 2 which is initially open on at least one side, such as at the back 1. The magnetic field sensor arrangement 3 includes a support 5, which is preferably made of a dielectric, such as glass or ceramic material. The support 5 is provided with strips of magnetic-field-dependent resistors 4 on the underside thereof, with four such resistors shown for illustration purposes, however, only one such resistor is required. A pole plate 6 of soft magnetic material is arranged on the upper side of support 5. The pole plate 6 is not essential, but facilitates operation of the detector. A permanent magnet 7 is oriented perpendicularly to the resistors 4 and positioned with one magnetic pole in contact with pole plate 6. The sensor arrangement 3 is positioned generally within the center of the housing, either directly, or indirectly through a film or an insulating layer, with the magnetic-field-dependent resistors against the inside of the housing wall which is designed in the form of a detector wall 20.

A plurality of electrical contact means (not shown completely in FIGS. 1 or 2 but similar to the complete contact means 8 shown in FIG. 4) are installed in housing 2. In this embodiment, the contact means are installed in the base wall 9, adjacent to and spaced apart from the permanent magnet 7, preferably two each on both sides. The installation is accomplished by inserting or forming electrical contact means (i.e., 8) directly in the housing provided that the housing is fabricated of dielectric material; or through an insulated sleeve arrangement when the housing is fabricated of aluminum or other conductive metallic material. By this type of electrical contact means, there is sufficient space within the housing to permit the magnetic-field-dependent resistors 4 to be easily connected with the internal terminals (coincident with item 11 in FIG. 1) by means of small wire conductors D. The electrical contact means are of particular advantage in the interconnection of miniaturized magnetic field sensors.

The external terminals 11 of the contact means can be designed in the form of solder contacts or, in the form of plug contacts. In FIG. 1 and 2, the contacts are preferably in the form of multiple-conductor-flat-cable plug contacts, thereby permitting the magnetic field detector to be equipped with dual-in-line terminals.

In addition, the external terminals 11 can be arranged asymmetrically in such a manner as to ensure proper insertion and connection in a printed circuit board S, or connection with a corresponding female connector. Alternatively, connections can be made to the detector by forming a suitable recess 12 on an edge 13 of housing 2, into which a corresponding mating member, such a pin of a male connector can fit. It is also advantageous to form a suitable projection, such as a nose or a pin which can engage a recess in a printed circuit or a female connector.

An attachment flange 14 can be provided on the base wall 9 of housing 2, in particular as an extension thereof. In addition, a reinforcing rib 15 can further be incorporated for reinforcement of attachment flange 14.

Figure 3:
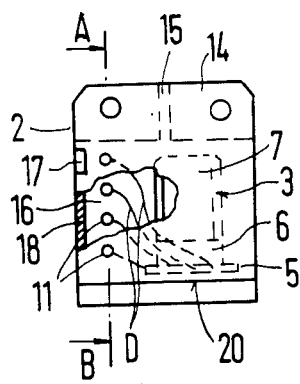
FIG. 3 is a front elevation view of another embodiment, shown partially in cross section.
Figure 4:
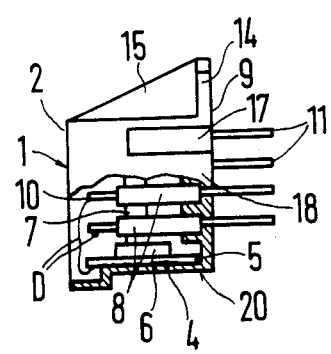
FIG. 4 is a side elevation view of the invention of FIG. 3, shown partially in cross section.

Referring now to FIGS. 3 and 4, another embodiment is shown wherein the magnetic field sensor arrangement 3 is not centrally positioned but is disposed somewhat lateerally. The contact means 8 are then arranged in one row as shown, or can be arranged in a plurality of rows in the laterally enlarged area 16, thereby permitting an in-line or a dual-in-line connection design. Here, also, it is possible to arrange external terminals 11 in such as asymmetrical manner as to permit unmistakable connection with a corresponding asymmetrical female connector. Also, the detector can be positioned to form an asymmetrical configuration on the exterior of the housing 2, for example a recess 17 on a side wall 18, into which a pin on a female connector can fit.

Figure 5:
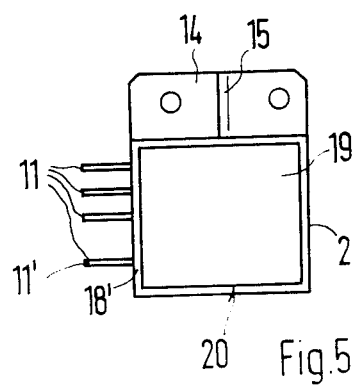
FIG. 5 is a rear elevation view of another embodiment of the invention.
Figure 6:
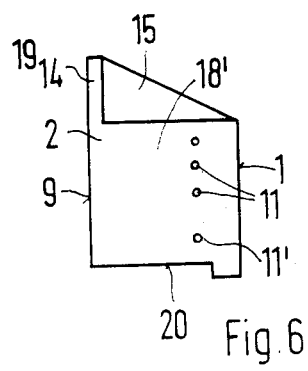
FIG. 6 is a side elevation view of the invention of FIG. 5.

In the embodiments shown in FIGS. 1 through 4, contact means 8 are attached so they extend through the base wall 9 of the housing. However, they can also be disposed on any one of the other sidewalls, such as 18' of housing 2 that is adjacent to detector wall 20, as illustrated in FIGS. 5 and 6. The detector wall 20 is flat except that it has a depression near the back 1 (FIGS. 2 and 4), and it can be seen that the support 5 and resistors 4 thereon extend over this depression. Also, the wire conductors D (FIG. 4) extend within the depression and connect to portions of the resistors lying over the depression.

Here, also, it is practical to attach magnetic field sensor arrangement 3 in such a manner that it is laterally displaced in the housing 2. Housing 2 can be covered or filled with a potting material 19, as suggested in FIG. 5 (and application to each embodiment). In this example, the external terminals 11 are arranged in an asymmetrical manner in that one external terminal 11' is arranged at a somewhat greater distance from neighboring external terminal 11. It could also be displaced laterally for a similar result.

It might also be practical for specific applications that the external terminals 11 project from the housing through the detector wall 20 that serves as the mating surface when the magnetic field detector is mounted.

The foregoing embodiments of the sensor arrangement are especially well suited for magnetic-field-dependent resistors in stripes which were treated during the fabrication process by a magnetic field whose nature is such that the easy-axis direction extends in the direction of the stripes, i.e., that they show a uniaxial anisotropy parallel to the magnetic-field-dependent resistor stripes. Stripes of this nature are preferably made of a ferromagnetic material, such as NiFe, CoFeB, FeB, etc., and their thickness is preferably not greater than 0.5 µm.

While specific embodiments of the present invention has been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A magnetic field detector comprising: a sensor arrangement including a dielectric support having thin strips of magnetic-field-dependent resistors on the underside thereof and having a pole plate of soft magnetic material positioned on the upper side thereof, and a permanent magnet oriented perpendicularly to the resistors with one pole in contact with the pole plate;
    a housing having walls including a detector wall and three side walls extending from said detector wall, and being open along one side, said sensor arrangement being disposed within said housing with the dielectric support and the resistors thereon positioned substantially against the detector wall and with a space being provided between said magnet and a side wall of said housing on at least one side of said magnet;
    a plurality of electrical contacts extending through one of said housing side walls, said contacts each having first and second ends, said first ends lying within said space in the housing and adjacent to but spaced from said magnet and being accessible from said open side, and said second ends being accessible from outside the housing; and
    a plurality of wire conductors that are thinner than said contacts connecting the first end of each of said contacts to one of said magnetic-field-dependent resistors.

2. The detector as recited in claim 1 wherein said second ends of said contacts extend from said housing asymmetrically and are formed to connect with a mating connector, whereby to urge connection of the detector in a defined orientation with a mating connector.

3. The detector as recited in claim 1 wherein the sensor arrangement is displaced laterally from a central disposition and first ends of said electrical contacts are positioned on only one side of the magnet thus enabling in-line connection.

4. The magnetic field detector as recited in claim 1 wherein said detector wall is generally flat but has a depression under said sensor arrangement, and said wire conductors extend within said depression and connect to portions of said resistors lying over said depression.

5. A magnetic field detector as defined in claim 1 wherein said sensor arrangement is disposed generally centrally within said housing so that one said space is provided on two opposite sides of said magnet; and at least some of said first ends of said contacts are disposed in each of said spaces.

6. A magnetic field detector as defined in claim 1 wherein said one housing side wall is the side wall opposite said open side.

7. A magnetic field detector as defined in claim 1 further comprising means for sealing said open side of said housing.

8. A magnetic field detector as defined in claim 7 wherein said means for sealing is a potting material.

9. In a magnetic field detector including a housing having at least an end wall and a plurality of side walls extending from said end wall, a support having a plurality of magnetic field dependent resistors on one surface thereof which is disposed against said end wall of said housing, a plurality of electrical contact members which are connected with said resistors within said housing and which extend through one of said side walls of said housing, and a permanent magnet disposed in said housing and having one pole face which extends in the direction of said surface of said support and which lies against said support; the improvement wherein: said side walls are arranged such that said housing is open on one side; said permanent magnet is disposed in said housing such that a space is provided within said housing between at least one side of said permanent magnet and an adjacent one of said side walls; the portions of said contact members within said housing are provided in said space adjacent, but spaced from, said magnet; and said contact members are connected with said magnetic field dependent resistors via respective wires disposed in said housing.

10. A magnetic field detector as defined in claim 9 wherein a space is provided within said housing on both sides of said magnet; and at least some of said contact members extend into each of said spaces.

11. A magnetic field detector as defined in claim 9 wherein said electrical contact members are linear members and extend through a side wall of said housing which is opposite said open side.

* * * * *